(12) United States Patent
Holmstadt (10) Patent No.: US 11,002,582 B2
(45) Date of Patent: May 11, 2021

(54) PROCESS TRANSMITTER WITH THERMAL FLUID DETECTION FOR DECREASING DAMAGE TO THE PROCESS TRANSMITTER COMPONENTS

(71) Applicant: Rosemount Inc., Shakopee, MN (US)

(72) Inventor: Clarence E. Holmstadt, Chaska, MN (US)

(73) Assignee: Rosemount Inc., Shakopee, MN (US)

( * ) Notice: Subject to any disclaimer, the term of this patent is extended or adjusted under 35 U.S.C. 154(b) by 88 days.

(21) Appl. No.: 16/146,025

(22) Filed: Sep. 28, 2018

(65) Prior Publication Data

US 2020/0103264 A1 Apr. 2, 2020

(51) Int. Cl.
*G01F 1/688* (2006.01)
*G01F 1/696* (2006.01)

(52) U.S. Cl.
CPC .............. *G01F 1/688* (2013.01); *G01F 1/696* (2013.01)

(58) Field of Classification Search
CPC ........ G01F 1/688; G01F 1/696; G01F 1/6847; G01F 1/6888; G01F 1/68; G01F 1/6986; G01F 1/69; G01F 1/34; G01F 1/05; G01F 1/46; G01F 1/38; G01F 1/075; G01F 1/58; G01F 15/18; G01F 15/005; G01F 15/185; G01L 7/00; G01L 1/10; G01L 9/025; G01L 19/0092; G01L 19/04; G01L 19/00; G01L 19/0061
See application file for complete search history.

(56) References Cited

U.S. PATENT DOCUMENTS

| 2008/0184775 | A1* | 8/2008 | Yamagishi | G01N 27/185 73/25.05 |
| 2010/0083731 | A1* | 4/2010 | Hedtke | G01L 27/007 73/1.57 |
| 2010/0083768 | A1* | 4/2010 | Hedtke | G01L 27/005 73/724 |

(Continued)

FOREIGN PATENT DOCUMENTS

| JP | 08122285 A | 5/1996 |
| JP | 2013228346 A | 11/2013 |
| KR | 1020100128921 A | 12/2010 |

OTHER PUBLICATIONS

International Search Report and Written Opinion for International Patent Application No. PCT/US2019/052901, dated Jan. 10, 2020, date of filing: Sep. 25, 2019, 13 pages.

(Continued)

*Primary Examiner* — Lisa M Caputo
*Assistant Examiner* — Nigel H Plumb
(74) *Attorney, Agent, or Firm* — Christopher R. Christenson; Kelly, Holt & Christenson PLLC (57) ABSTRACT

A process transmitter includes a transmitter housing and a liquid detector coupled to the transmitter housing. The liquid detector includes a temperature sensor configured to generate signals indicative of a presence of liquid within the transmitter housing. The process transmitter also includes a controller coupled to the liquid detector configured to receive the generated signals, determine the presence of liquid within the transmitter housing based on the received signals, and generate an output indicative of the determined presence of liquid within the transmitter housing.

14 Claims, 10 Drawing Sheets

(56) References Cited

U.S. PATENT DOCUMENTS

2015/0276528 A1* 10/2015 Willcox ............... G01L 9/0072
  73/718
2016/0290882 A1* 10/2016 Strei ...................... B23K 31/02
2017/0089793 A1* 3/2017 Fetisov ................ G01L 9/0064
2017/0131150 A1* 5/2017 Thies ........................ G01F 1/00
2017/0212065 A1* 7/2017 Rud ....................... G01K 13/02
2018/0003655 A1* 1/2018 Rud ......................... G01K 1/08
2018/0087987 A1* 3/2018 Rodeheffer ............ G01L 19/04
2018/0364124 A1* 12/2018 Strei .................... G01L 9/0044

OTHER PUBLICATIONS

First Chinese Office Action dated Jan. 29, 2021 for Chinese Patent Application No. 201910167045.0, 26 pages including English translation.

* cited by examiner

PROCESS TRANSMITTER WITH THERMAL FLUID DETECTION FOR DECREASING DAMAGE TO THE PROCESS TRANSMITTER COMPONENTS

BACKGROUND

Industrial process control systems are used to monitor and control industrial processes used to produce or transfer fluids or the like. In such systems, it is typically important to measure "process variables" such as temperatures, pressures, flow rates, etc. Process control transmitters are used to measure such process variables and transmit information related to the measured process variable back to a central location such as a central control room.

For example, one type of process variable transmitter is a pressure transmitter which measures process fluid pressure and provides an output related to the measured pressure. This output may be a pressure, a flow rate, a level of a process fluid, or other process variable that can be derived from the measured pressure.

In operation, process control transmitters may be mounted to a variety of processes within different environments. In one example, process control transmitters may be field mountable which, in turn, can subject the process control transmitters to high humidity, rain, flooding, etc. In turn, this can damage electrical components of the process control transmitters. For example, improper installation of a process control transmitter can result in loose covers and/or leaky conduits and cable glands which can introduce environmental moisture into a housing of the process control transmitter. Introduction of moisture often leads to an output error and, over time, can even lead to a failure of the transmitter.

To detect a presence of moisture within the housing/terminal block of the process control transmitters, current attempts often necessitate a user first removing the transmitter from a control loop and manually running a multi-step diagnostic operation on the transmitter. However, this is often reactive indicating an error only after a transmitter output has experienced an output shift. Additionally, other examples often include using electrical conductivity (resistive or capacitive) to detect a presence of moisture. However, these methods are often unreliable and sensitive to contamination, leakage currents and false alarms. For example, once contaminated, various sensors can become extremely sensitive to humidity causing the sensors to falsely detect water when no water is present.

SUMMARY

A process transmitter includes a transmitter housing and a liquid detector coupled to the transmitter housing. The liquid detector includes a temperature sensor configured to generate signals indicative of a presence of liquid within the transmitter housing. The process transmitter also includes a controller coupled to the liquid detector configured to receive the generated signals, determine the presence of liquid within the transmitter housing based on the received signals, and generate an output indicative of the determined presence of liquid within the transmitter housing.

DETAILED DESCRIPTION OF ILLUSTRATIVE EMBODIMENTS

During operation of a process variable transmitter within a field application, it may be necessary to detect a presence of moisture, or other fluid, within a housing of the process variable transmitter to ensure accurate outputs are being provided while simultaneously ensuring the process variable transmitter is not being damaged.

In accordance with various embodiments, a process variable transmitter is provided with a liquid detector that allows for a detection of moisture, or other fluid, within a housing of the process variable transmitter. Embodiments described herein generally provide a liquid detector that detects liquid in an electronics housing based on a thermal conductivity of the liquid instead of an electrical conductivity of liquid. Accordingly, the detector is not susceptible to electrically conductive contamination. Additionally, this allows the liquid detector to be less susceptible to false alarms from minor water droplet condensation.

While the present description proceeds with respect to a process fluid pressure transmitter, it is contemplated that the present invention can be utilized in a wide variety of other process devices that have electronics housings.

Figure 1:
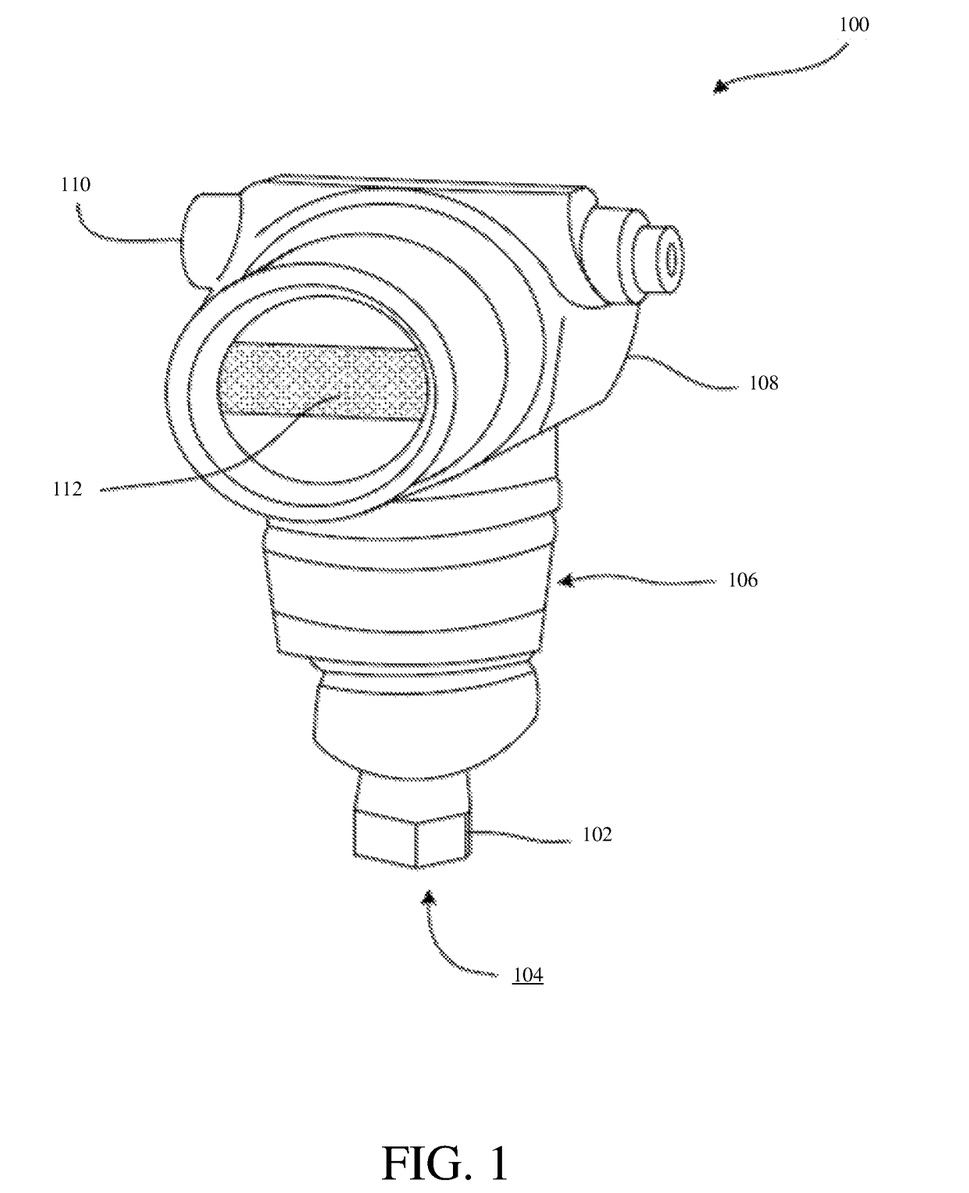
FIG. 1 is a diagrammatic perspective view of a process fluid pressure transmitter with which embodiments of the present invention may be used.

FIG. 1 is a diagrammatic perspective view of a process fluid pressure transmitter with which embodiments of the present invention are particularly useful. Pressure transmitter 100 includes a process fluid connector 102, a sensor body 106, electronics housing 108, a display 112 and a conduit 110. In operation, pressure transmitter 100 can be coupled to a source of process fluid 104 through process fluid connector 102 in which received process fluid bears against a diaphragm within sensor body 106. The diaphragm, upon receiving the process fluid, undergoes a change detectable by a pressure sensor (shown in FIG. 2 as sensor 126) disposed within sensor body 106. The pressure sensor has an electrical characteristic, such as capacitance or resistance, which is measured by measurement circuitry (shown in FIG. 2 as measurement circuitry 124) in electronics housing 108 and converted to a process fluid pressure using suitable calculations by a controller. A process fluid pressure can be conveyed over a process communication loop via wires coupled through conduit 110 and/or displayed locally through display 112. Additionally, in other examples, the process fluid pressure may be conveyed wirelessly.

Figure 2:
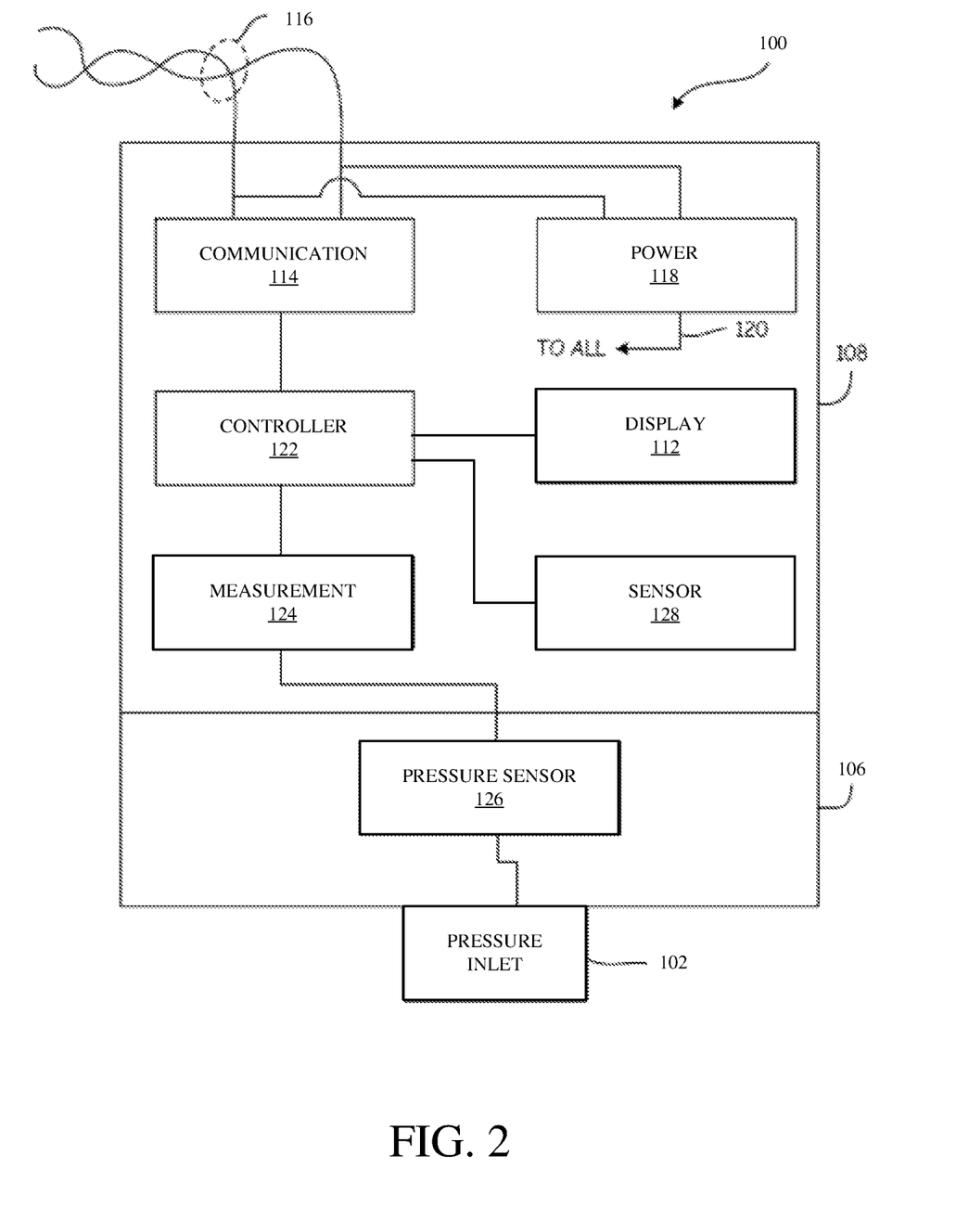
FIG. 2 is a block diagram of a process fluid pressure transmitter in accordance with an embodiment of the present invention.

FIG. 2 is a block diagram of a process fluid pressure transmitter in accordance with an embodiment of the present invention. Pressure transmitter 100 illustratively includes communication circuitry 114, power circuitry 118, measurement circuitry 124, a controller/processor 122, a display 112, a liquid detector 128, and a pressure sensor 126 configured to couple to process fluid received through connector 102 within sensor housing 106.

Before describing the operation of liquid detector 128, a brief description of the other components within transmitter 100 will first be provided. Communication circuitry 114 is disposed within electronic housing 108 and can be coupled to a process communication loop through conductors 116. By virtue of coupling to process communication loop 116, communication circuitry 114 allows process pressure transmitter 100 to communicate in accordance with an industry-standard process communication protocol. Examples include the Highway Addressable Remote Transducer (HART®) protocol, the FOUNDATION™ Fieldbus protocol, among others. In some examples, communication circuitry 114 also allows for transmitter 100 to communicate wirelessly with other devices, such as that in accordance with IEC 62591 (WirelessHART). Furthermore, in some examples, transmitter 100 may receive all requisite electrical power for operation through its coupling to the process communication loop.

Power module 118, in one example, is coupled to a process communication loop in order to supply suitable operating power to all components of transmitter 100, as indicated at reference numeral 120 labeled "to all."

Measurement circuitry 124 is coupled to one or more sensor(s) 126, such as a pressure sensor, to sense a process variable. Measurement circuitry 124 includes, in one example, one or more analog-to-digital converters, linearization and/or amplification circuitry, and provides an indication of one or more sensed analog values to controller 122 in the form of a digital signal.

Controller/processor 122 is coupled to communication circuitry 114, measurement circuitry 124, display 112 and detector 128 such that information received from measurement circuitry 124 and/or detector 128 can be displayed and/or communicated over a process communication loop or in accordance with a wireless communication protocol. In one example, a generated display can include a measured process variable and/or an indication as to whether moisture is present within a transmitter housing as will be discussed later with respect to FIGS. 3-5. Controller/processor 122 can also include, or be coupled to, suitable memory which can store program data as well as process data. Memory can include volatile and/or non-volatile memory. In one example, controller/processor 122 is a microprocessor with suitable memory such that controller/processor 122 is able to programmatically execute a series of program steps in order to serve its function(s) as a measurement instrument.

Pressure sensor 126 measures a pressure of a process fluid sample received through process fluid connector 102. In one example, sensor 126 can be coupled to a diaphragm within sensor housing 106 that, in operation, directly contacts received process fluid through connector 102. In this example, sensor 126 can be coupled to the diaphragm such that sensor 126 does not directly contact the received process fluid, but rather determines a pressure based on a deformation of the diaphragm resulting from the received process fluid. However, in other examples in which transmitter 100 is a different type of transmitter, sensor 126 can include a wide variety of sensors depending on a desired process variable to be measured.

During operation of transmitter 100, it may be necessary to detect a presence of moisture, or fluid, within a housing of transmitter 100. This can include sensor housing 106 and/or electronics housing 108. For example, transmitter 100 can be coupled to a field application which, in turn, can subject transmitter 100 to high humidity, rain, flooding, etc. In turn, this can damage one or more electrical components of transmitter 100. In order to detect a presence of moisture, or fluid, within a housing of transmitter 100, controller/processor 122 is coupled to liquid detector 128, that detects moisture, or other fluid, based on a change in thermal mass and thermal conductivity.

Figure 3:
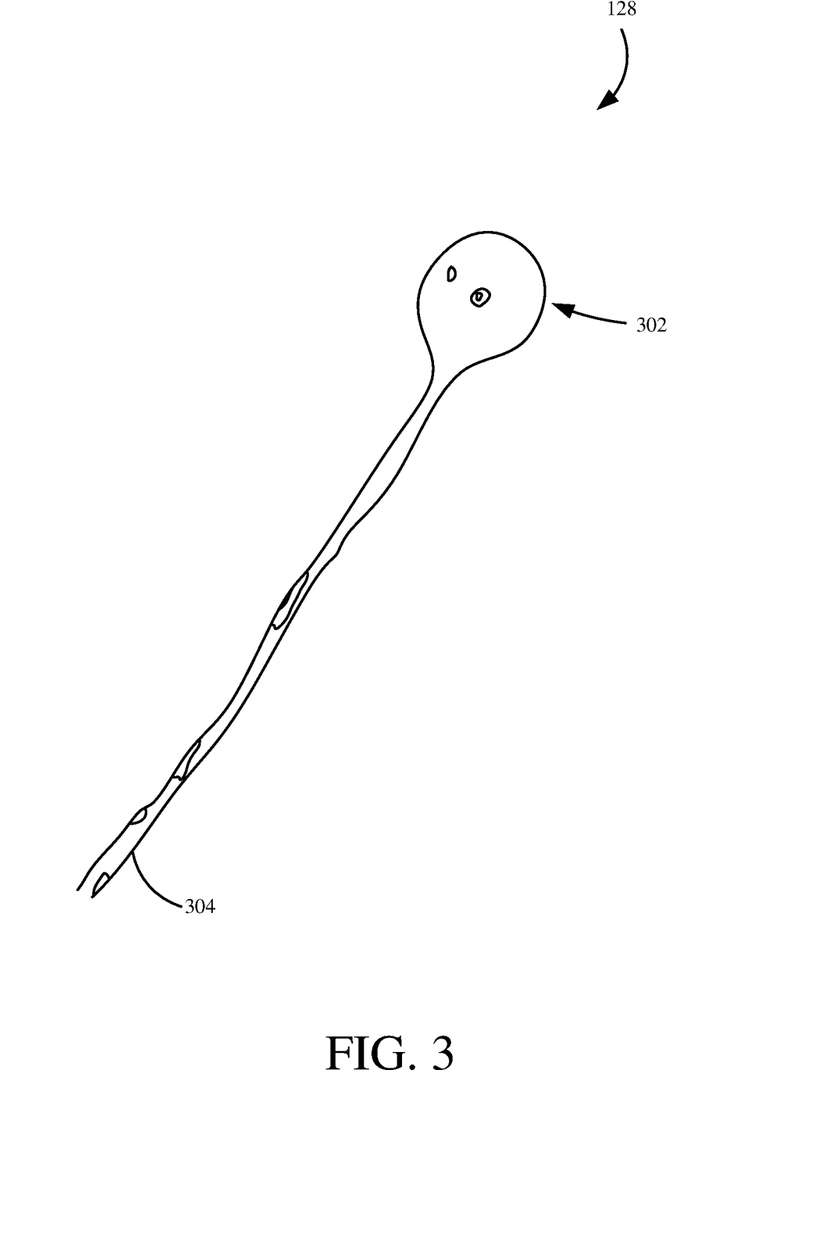
FIG. 3 is a diagrammatic view of a liquid detector in accordance with an embodiment of the present invention.

FIG. 3 is a diagrammatic view of a liquid detector in accordance with an embodiment of the present invention. Liquid detector 128 illustratively includes a moisture, or fluid, detector 302 and electrical connector(s) 304 that, in operation, couple liquid detector 128 to processor/controller 122. Additionally, liquid detector 128 can be coated in epoxy for environmental protection. In operation, liquid detector 128 can be disposed within a transmitter housing and used to determine a presence of moisture, or fluid, within a transmitter housing. For example, detector 302 includes a temperature sensor bonded to a heating element that allows for a detection of moisture, or fluid, within a transmitter housing as will be discussed later. However, in one example, the heating element and the temperature sensor can include a resistor and a diode. However, other types of heating elements and temperature sensors may be used as well. Further, it is expressly contemplated that the heater and temperature sensor may be the same physical structure such as a winding of temperature sensitive wire (e.g. platinum). To detect a presence of moisture, or fluid, within a transmitter housing, liquid detector 128 is repeatedly heated and cooled by cycling power to the heating element as will be discussed with respect to FIG. 4.

Figure 4:
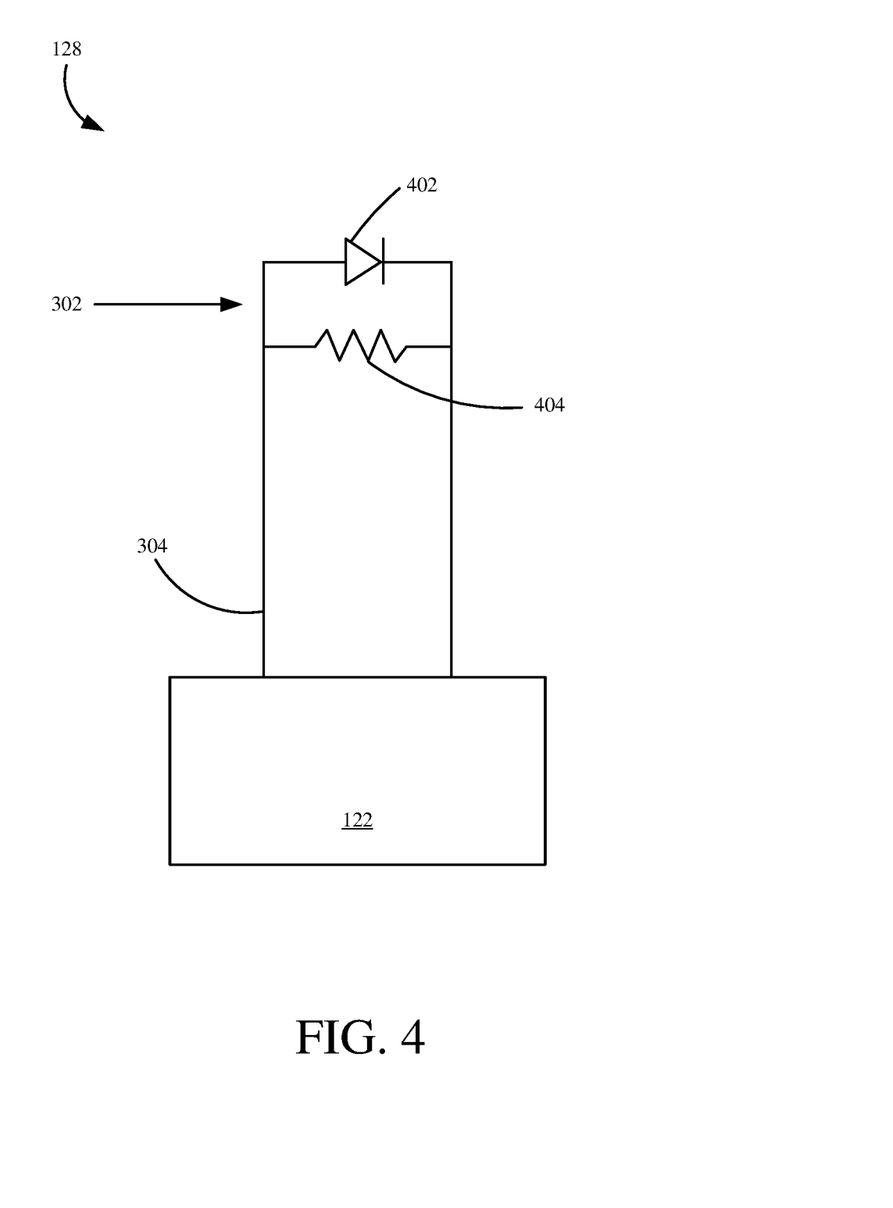
FIG. 4 is a diagrammatic circuit view of a liquid detector coupled to a controller/processor in accordance with an embodiment of the present invention.

FIG. 4 is a diagrammatic circuit view of a liquid detector coupled to a controller/processor in accordance with an embodiment of the present invention. Liquid detector 128 illustratively includes moisture, or fluid, detector 302 that includes a heating element 404 and a temperature sensor 402, and electrical connector(s) 304 coupled to processor/controller 122.

Temperature sensor 402 and heating element 404 can take a variety of forms and configurations depending on a moisture detection operation. While one form of a temperature sensor 402 and heating element 404 will now be discussed in which temperature sensor 402 is a diode and heating element 404 is a resistor, it is contemplated that a variety of other temperature sensors and heating elements may be used as well. However, in this example, diode 402 comprises two types of semiconductor materials, p-type and n-type, that form a p-n junction that allows for electric current to flow in one direction while blocking current in an opposite direction. In one example, this allows diode 402 to be operated in a forward biasing manner, in which an electric current is allowed to flow through diode 402, and a reverse biasing manner in which electric current is prohibited from flowing through diode 402. Diode 402 can be formed of a variety of different types of materials such as silicon, gallium arsenide and germanium.

In operation, detector 302 is coupled to processor/controller 122 through electrical connector(s) 304, that, in one example, include copper wires. Once detector 302 is coupled to processor/controller 122, processor/controller 122 can perform a variety of functions that allow for a detection of moisture, or fluid, within a transmitter housing. For example, one operation for detecting a presence of moisture using controller/processor 122 and liquid detector 128 will now be discussed.

In operation, a voltage potential can be provided by processor/controller 122 that initially reverse biases diode 402. This forces all subsequent electrical current through resistor 404, which, in turn, causes resistor 404, and diode 402, to which resistor 404 is bonded, to heat up. Once diode 402 is heated, power can be removed from liquid detector 128. Processor/controller 122 may then generate current configured to flow through the heated diode 402 in a forward biasing manner, in which a voltage drop is measured across the heated diode 402. The measured voltage drop is indicative of a current operating temperature of liquid detector 128. For example, for generated current to flow through diode 402 in a forward biasing manner, the current has to overcome a potential barrier at the p-n junction. This is typically about 0.6-0.7 volts for silicon and 0.3-0.35 volts for germanium. However, depending on a temperature of liquid detector 128, the potential barrier varies in accordance with the Shockley diode equation. As such, by determining a voltage drop across the heated diode 402, an operating temperature can be determined.

Once a current operating temperature is determined, diode 402 is allowed to cool for a predetermined amount of time. Afterwards, processor/controller 122 generates another current configured to flow through diode 402 in a forward biasing manner. A subsequent voltage drop across diode 402 is then determined. Based on the subsequent voltage drop, a new operating temperature is calculated. Using the two determined temperatures, processor/controller 122 can determine a temperature difference to determine whether moisture, or fluid, is present within a transmitter housing. For example, depending on whether liquid detector 128 is in air or water (or another fluid), there is a measurable difference between the heated detector temperature and the cooled detector temperature. Therefore, based on the difference between detector temperatures, controller/processor 122 can detect a presence of moisture, or fluid, within a transmitter housing. This phenomenon is illustratively shown in FIG. 7, which will be discussed later.

Figure 5A:
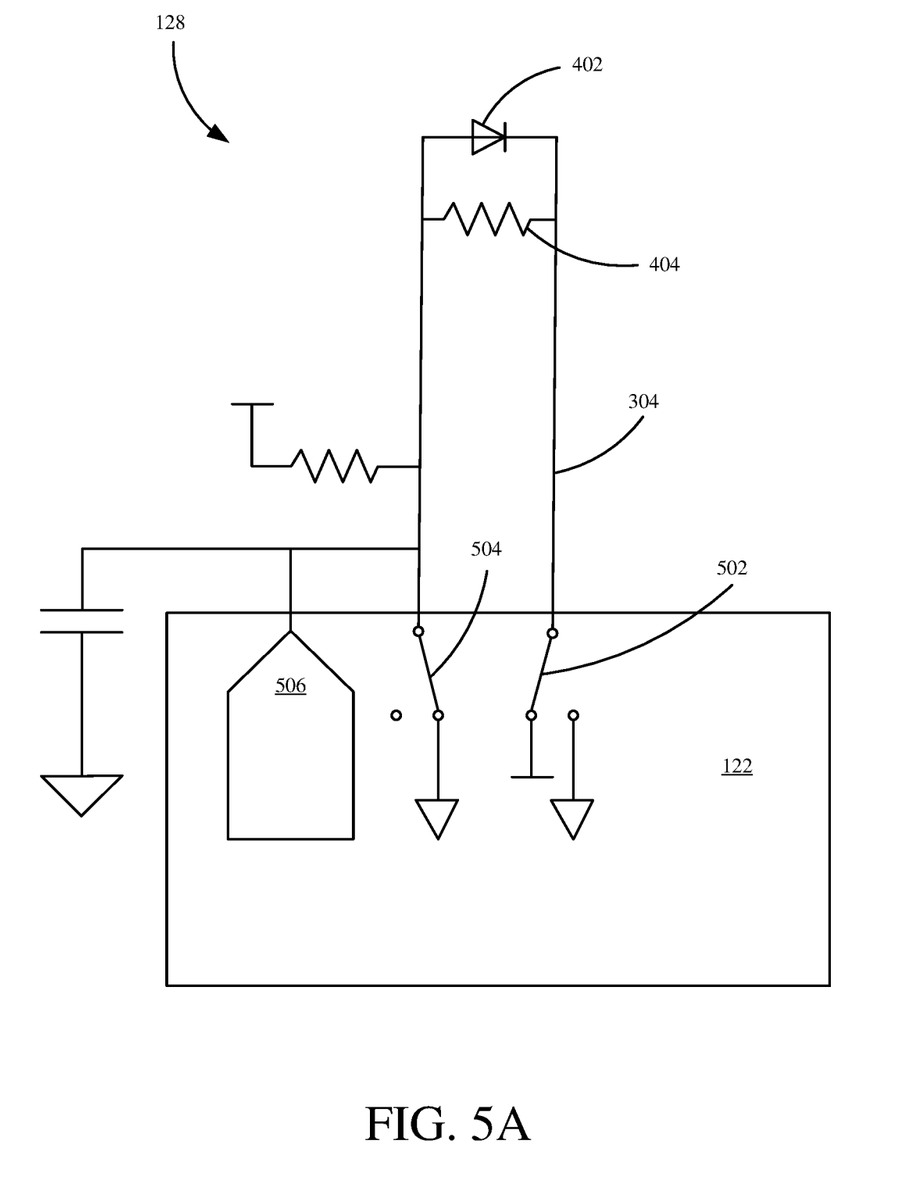
FIGS. 5A-5B are diagrammatic circuit views of a liquid detector coupled to various ports of a processor/controller in accordance with an embodiment of the present invention.
Figure 5B:
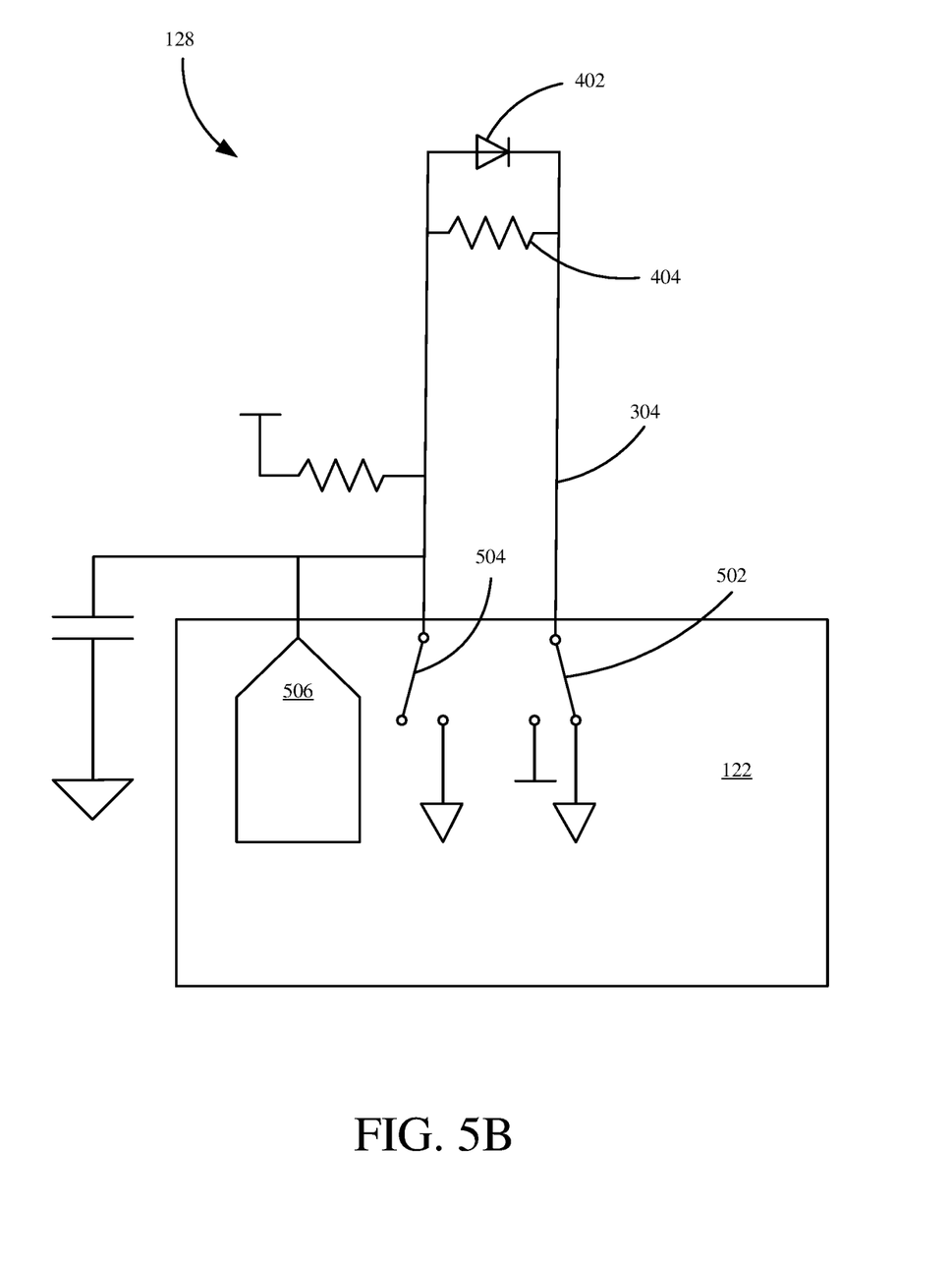

FIGS. 5A-5B are diagrammatic circuit views of a liquid detector coupled to various ports of a processor/controller in accordance with an embodiment of the present invention. As illustratively shown in FIG. 5A, liquid detector 128 includes diode 402, resistor 404, and electrical connector(s) 304 configured to couple to various ports of processor/controller 122. During a heating phase in which a voltage potential is applied to reverse bias diode 402, processor/controller 122 can include switches 502 and 504 that modify a current path through liquid detector 128. For example, as illustratively shown in FIG. 5A, during a heating phase, switches 502 and 504 can be at the illustrated position to supply a voltage potential that reverse biases diode 402. In this example, supplied current can almost exclusively travel through resistor 404, which, in turn, heats resistor 404 and diode 402.

Alternatively, as illustratively shown in FIG. 5B, during a measurement and cooling phase in which a heated diode 402 is operated in accordance with a forwarding bias, a position of switches 502 and 504 can be altered to allow generated current to flow through diode 402 and analog-to-digital converter 506. In turn, a voltage drop may be determined across diode 402. However, while FIGS. 5A and 5B illustrate example circuit diagrams for operating liquid detector 128 during the various heating, cooling and measurement phases, additional configurations are contemplated herein.

Figure 6:
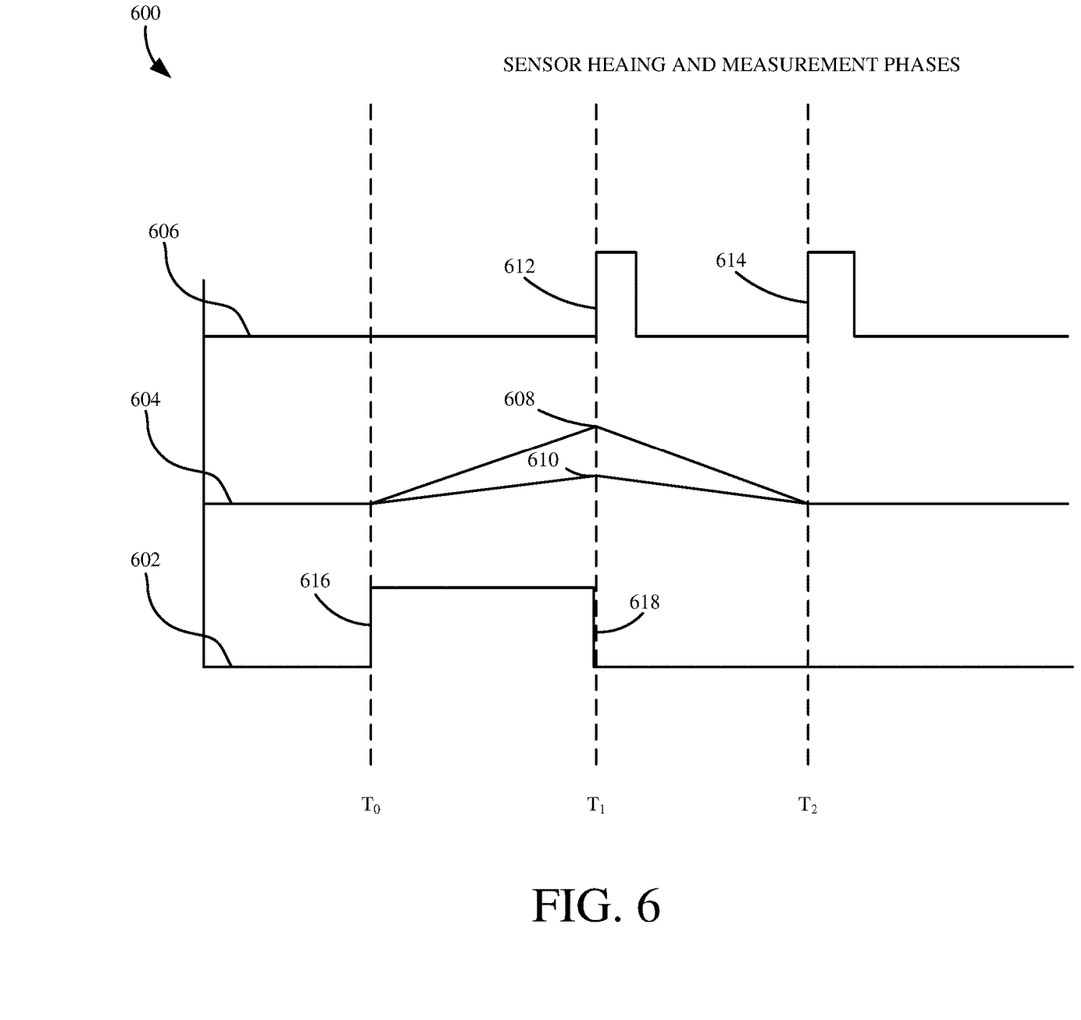
FIG. 6 is a phase diagram illustratively showing heating, cooling and measurement phases of a liquid detector in accordance with an embodiment of the present invention.

FIG. 6 is a phase diagram illustratively showing heating, cooling and measurement phases of a liquid detector in accordance with an embodiment of the present invention. As illustratively shown in FIG. 6, graph 600 includes multiples phases generally indicated by lines 602, 604 and 606. For example, line 602 generally refers to a period in which a heater (e.g., resistor 404) begins generating heat at time $t_0$, generally as indicated by line 616, and turned off at time $t_1$, generally as indicated by line 618. During this time period between $t_0$ and $t_1$, heat is generated by resistor 404 and increases a temperature of a temperature sensor (e.g., diode 402) as illustratively shown by line 604.

For example, at time $t_0$, corresponding to a time in which resistor 404 begins generating heat, a temperature of a temperature sensor (e.g., diode 402) increases as generally indicated by lines 608 and 610. In one example, line 608 corresponds to a temperature of diode 402 in the circumstance there is no moisture, or liquid, present within a transmitter housing. Alternatively, line 610 corresponds to a temperature of diode 402 in the example there is moisture, or fluid, present within a transmitter housing. As illustratively shown along line 604, a temperature of diode 402 is greater in the circumstance liquid detector 128 is operated in a relatively dry environment as indicated by line 608 relative to line 610. At time $t_1$, corresponding to a time in which resistor 404 stops generating heat, a temperature of diode 402 generally decreases as illustratively shown.

Line 606 illustrates various times at which a temperature of diode 402 is measured. For example, a first measurement is taken at time $t_1$, generally as indicated by line 612, corresponding to a time resistor 404 stops generating heat. After a predetermined time period (e.g., a time period between $t_1$ and $t_2$), a second measurement is taken at $t_2$ as generally indicated by line 614. Based on a temperature difference of diode 402 between $t_1$ and $t_2$, a presence of moisture, or fluid, within a transmitter housing of liquid detector 128 can be determined.

For example, as illustratively shown in FIG. 6, a temperature of liquid detector 128 varies depending on an environment of liquid detector 128. For example, under dry conditions, a temperature of diode 402 is greater, as generally indicated by line 608, relative to a temperature of diode 402 under wet conditions, as generally indicated by line 610. Therefore, based on a temperature difference of diode 402 between $t_1$ and $t_2$, a presence of moisture, or fluid, within a transmitter housing can be determined.

Figure 7:
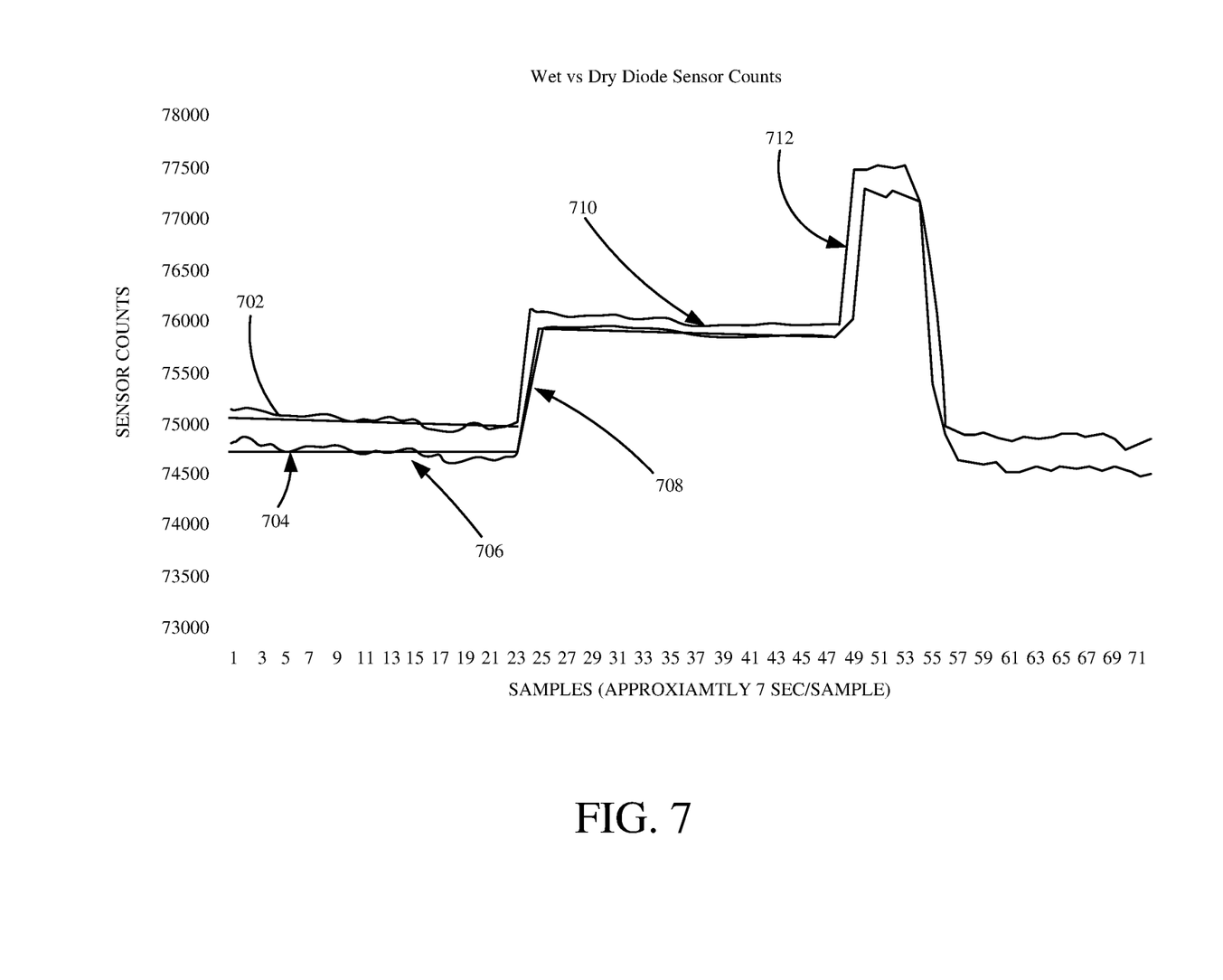
FIG. 7 is a graph illustratively showing detector count differences of a liquid detector in accordance with an embodiment of the present invention.

FIG. 7 is a graph illustratively showing detector count differences of a liquid detector in accordance with an embodiment of the present invention. As illustratively shown in FIG. 7, counts obtained from liquid detector 128 vary based on different environmental factors. For example, line 702 represents detector counts obtained when liquid detector 128 is relatively cooled. Alternatively, line 704 represents detector counts obtained when liquid detector 128 is operated at an elevated temperature. At point 706, liquid detector 128 is operated in a relatively dry environment, while at point 708, liquid detector 128 is submerged in water. Subsequently, at point 712, liquid detector 128 is removed from water. As illustratively shown at point 706, liquid detector 128 operating in a dry environment typically has a count difference of 300 between when liquid detector 128 is cooled, as indicated by line 702, versus warmed, as indicated by line 704. Alternatively, at point 710, liquid detector 128 is submerged in water and exhibits a count difference of 100. Therefore, based on the respective count differences obtained while liquid detector 128 is operating in either a dry or wet environment, liquid detector 128 can indicate a presence of water within a transmitter housing.

Figure 8A:
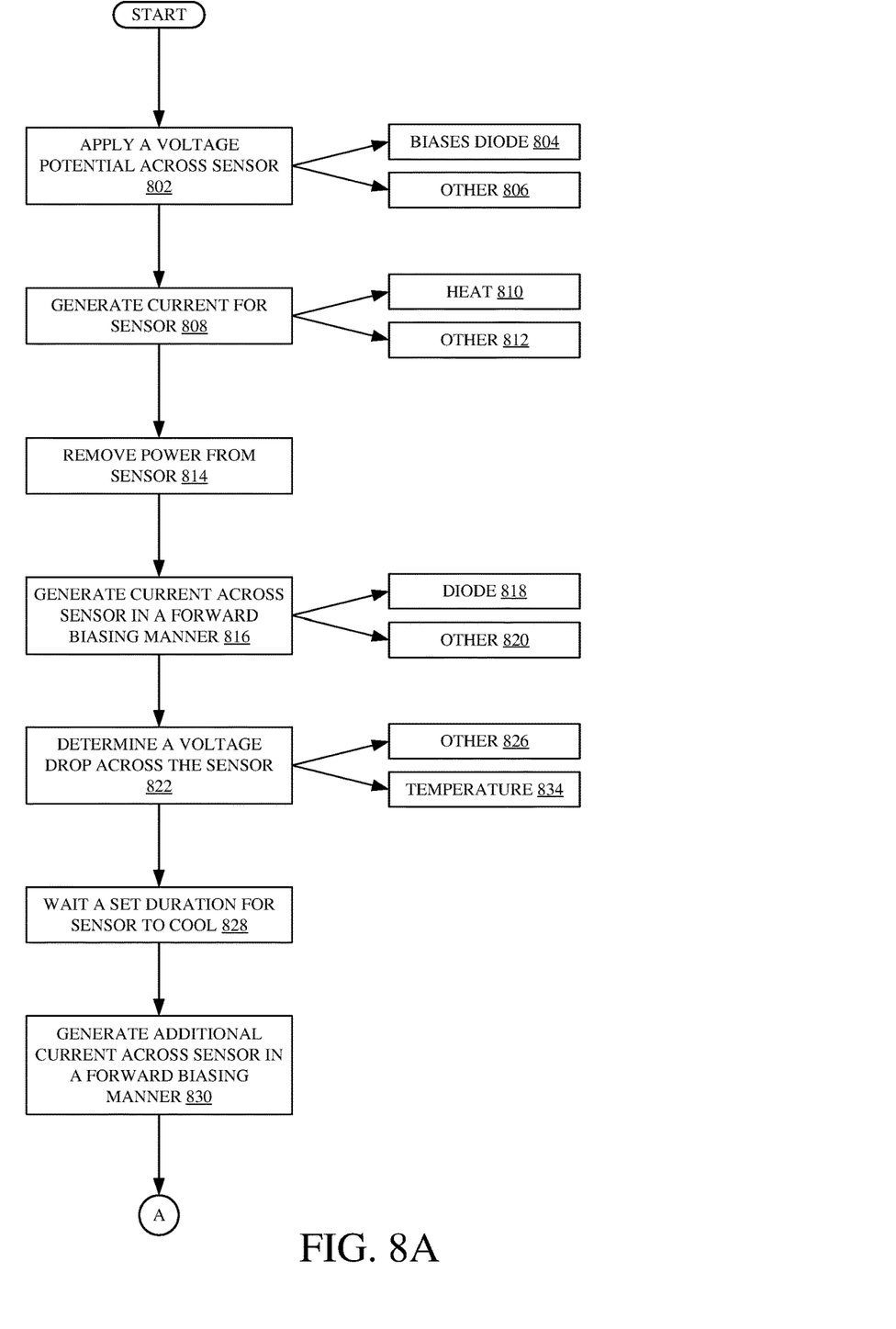
FIGS. 8A-8B are a method of detecting water within a transmitter housing in accordance with embodiments of the present invention.
Figure 8B:
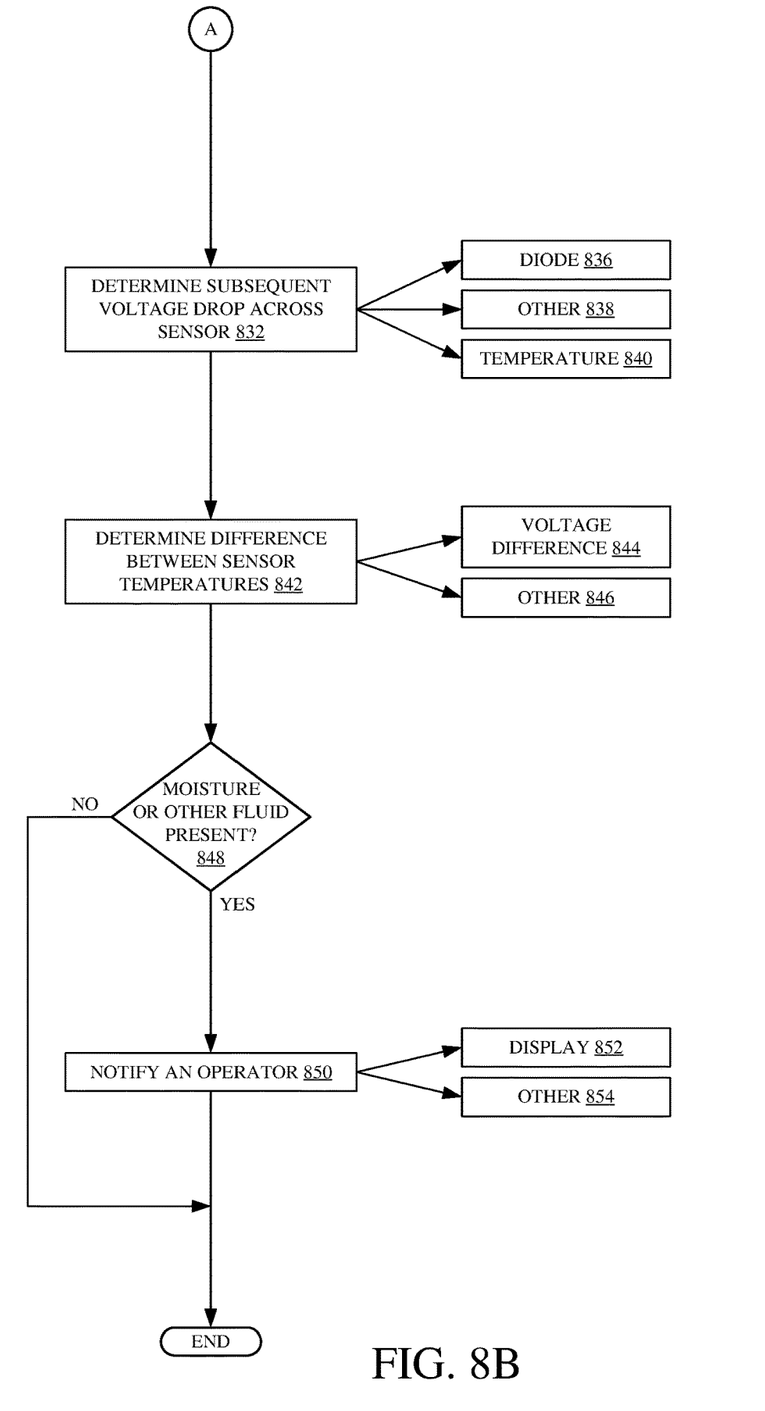

FIGS. 8A-8B are flow diagrams of a method of detecting water within a transmitter housing in accordance with embodiments of the present invention. It is to be understood that method 800 can be utilized in a variety of different transmitters to detect a presence of moisture, or fluid, within a transmitter housing. However, in the present example, processing begins at block 802 where processor/controller 122 generates a voltage potential across liquid detector 128. In one example, a generated voltage potential can bias a diode (e.g., diode 402) in a reverse-manner to almost exclusively allow current to flow through a heater (e.g., resistor 404) as indicated by block 804. However, it is contemplated that a variety of other components may be used as well as indicated by block 806.

Upon generating a voltage potential across liquid detector 128, processing turns to block 808 where processor/controller 122 generates electrical current for liquid detector 128. In one example, generated current travels almost exclusively through the heater in order to generate heat as indicated by block 810. However, it is contemplated that, in other examples, current can travel through additional components as well as indicated by block 812. In one example, due to a proximity of the heater to the diode, generated heat from the heater is supplied to the diode in order to increase an operating temperature of the diode.

After a predetermined amount of time, processing proceeds to block 814 where processor/controller 122 removes power from liquid detector 128. In one example, by removing power from liquid detector 128, the heating element stops generating heat. Processing then turns to block 816 where processor/controller 122 generates current for liquid detector 128 in a forward biasing manner to allow generated current to flow through the diode. This is indicated by block 818. However, in other examples, current can travel through additional components as well as indicated by block 820.

Upon generating current configured to travel along the diode in a forward biasing manner, processor/controller 122 determines a voltage drop across the liquid detector 128 as indicated by block 822. In one example, this includes determining a voltage drop across the diode. Based on the determined voltage drop, processor/controller 122 determines an initial operating temperature of the diode as indicated by block 834. However, a variety of other characteristics and operating parameters of liquid detector 128 can be determined as well as indicated by block 826.

Once an initial operating temperature of liquid detector 128 is determined, processor/controller 122 waits a predetermined amount of time for liquid detector 128 to cool as indicated by block 828. This can range over any desired amount of time which can include several seconds, minutes, etc. Once liquid detector 128 is allowed to cool, processing turns to block 830 where processor/controller 122 generates additional current for liquid detector 128. In one example, additional current can travel across the diode in a forward biasing manner as well. A subsequent voltage drop is then determined by processor/controller 122 as indicated by block 832. In one example, a subsequent voltage drop can be determined across the diode, as indicated by block 836, which, in turn, allows processor/controller 122 to determine a new operating temperature of liquid detector 128, as indicated by block 840. However, other characteristics of liquid detector 128 can be determined as well as indicated by block 838.

Processing subsequently turns to block 842 where processor/controller 122 determines a difference between the determined detector temperatures. In one example, processor/controller 122 may also first determine a voltage drop difference across liquid detector 128 as indicated by block 844. However, a variety of other information may be determined as well as indicated by block 846.

Processor/controller 122 then determines whether moisture, or fluid, is present based on the determined difference as indicated by block 848. For example, a determined voltage drop or temperature difference for liquid detector 128 will vary based on a presence of moisture, or fluid. If moisture, or fluid, is present, a difference between voltage drops or temperatures will be relatively smaller compared to a difference between voltage drops or temperatures in the absence of fluid. This phenomenon is illustrated in FIGS. 6 and 7.

If moisture or fluid is present, processing turns to block 850 where processor/controller 122 notifies an operator of the detected moisture. In one example, this can include generating a display, as indicated by block 852, or a variety of other signals as indicated by block 854. However, if no moisture or fluid is detected, processing subsequently ends.

Although the present invention has been described with reference to preferred embodiments, workers skilled in the art will recognize that changes may be made in form and detail without departing from the spirit and scope of the invention. For example, it is expressly contemplated that all necessary circuitry, heating, and sensing components could be provided in on a single silicon die. This die/chip could then provide a simple indication (i.e. logic level output or communication) based on the presence of water or liquid within the transmitter housing.

What is claimed is:

1. A process transmitter, comprising:
  a transmitter housing having a conduit coupling;
  a liquid detector disposed within the transmitter housing, the liquid detector including a temperature sensor configured to generate signals indicative of a presence of liquid within the transmitter housing;
  communication circuitry disposed within the housing and configured to communicate in accordance with an industry-standard process communication protocol; and
  a controller disposed within the transmitter housing and coupled to the communication circuitry and the liquid detector, the controller being configured to receive the generated signals, determine the presence of liquid within the transmitter housing based on the received signals, and generate an output indicative of the determined presence of liquid within the transmitter housing.

2. The process transmitter of claim 1, wherein the liquid detector further comprises:
  a heating element coupled to the temperature sensor configured to receive current from the controller and generate heat for the temperature sensor.

3. The process transmitter of claim 2, wherein the heating element comprises a resistor and the temperature sensor comprises a diode connected in parallel within an electrical circuit of the liquid detector.

4. The process transmitter of claim 3, wherein the diode generates the signals corresponding to voltage drops across the diode at different times.

5. The process transmitter of claim 4, wherein the controller, upon receiving the signals from the diode, determines operating temperatures of the diode based on the voltage drops across the diode at different times.

6. The process transmitter of claim 5, wherein the controller determines the presence of liquid based on a difference in operating temperatures of the diode.

7. The process transmitter of claim 4, wherein the signals comprise a first signal corresponding to a first voltage drop of the diode at a first time and a second signal corresponding to a second voltage drop of the diode at a second time.

8. The process transmitter of claim 7, wherein the first time comprises a time in which the diode is operated at an elevated operating temperature after receiving the generated heat from the heating element and the second time comprises a later time in which power is not provided to the heating element.

9. The process transmitter of claim 1, wherein the controller generates the output for a user interface device configured to, upon receiving the output, display the determined presence of liquid within the transmitter housing.

10. A process transmitter, comprising:

a transmitter housing having a conduit coupling;

a liquid detector disposed within the transmitter housing, the liquid detector including an electronic circuit comprising a heating element configured to generate heat and a temperature sensor electrically coupled to the heating element configured to receive the generated heat and generate signals indicative of a presence of liquid within the transmitter housing;

communication circuitry disposed within the housing and configured to communicate in accordance with an industry-standard process communication protocol; and a controller coupled to the communication circuitry and the liquid detector, the controller being configured to receive the signals and determine the presence of liquid within the transmitter housing based on the received signals.

11. The process transmitter of claim 10, wherein the temperature sensor comprises a diode and the heating element comprises a resistor connected in parallel within the electronic circuit.

12. The process transmitter of claim 11, wherein the generated signals correspond to voltage drops across the diode at different times, and, the controller, upon receiving the generated signals, determines operating temperatures of the diode at different times based on the voltage drops across the diode.

13. The process transmitter of claim 12, wherein the controller determines the presence of liquid within the transmitter housing based on a temperature difference of the liquid detector.

14. The process transmitter of claim 13, wherein, upon determining the presence of liquid within the transmitter housing, the controller is configured to generate an output for a user interface device.

* * * * *